United States Patent [19]
Hildebrandt et al.

[11] Patent Number: 6,147,183

[45] Date of Patent: Nov. 14, 2000

[54] AMPHOTERIC AMINE BASED POLYMERS HAVING A NET CATIONIC CHARGE AND PROCESS FOR THEIR PRODUCTION

[75] Inventors: Sören Hildebrandt, Speyer; Elisabeth Kappes; Dieter Boeckh, both of Limburgerhof, all of Germany; Rajan Panandiker, West Chester, Ohio; Sherri Randall, Hamilton, Ohio; Eugene Paul Gosselink, Cincinnati, Ohio; William Conrad Wertz, West Harrison, Ind.

[73] Assignee: BASF Aktiengesellschaft, Ludwigshafen, Germany

[21] Appl. No.: 09/153,084

[22] Filed: Sep. 15, 1998

Related U.S. Application Data

[60] Provisional application No. 60/058,931, Sep. 15, 1997, and provisional application No. 60/058,810, Sep. 15, 1997.

[51] Int. Cl.⁷ .......................... C08G 69/00; C08G 73/00; C08G 63/00
[52] U.S. Cl. .......................... 528/327; 528/361; 528/363; 528/370; 528/392; 528/403; 528/422; 528/423; 525/408; 525/410; 525/413; 525/418
[58] Field of Search ..................................... 528/327, 392, 528/361, 363, 423, 370, 422, 403; 525/408, 413, 410, 418, 331.1

[56] References Cited

U.S. PATENT DOCUMENTS

| | | |
|---|---|---|
| 3,864,317 | 2/1975 | Ogata et al. . |
| 3,910,862 | 10/1975 | Barabas et al. . |

FOREIGN PATENT DOCUMENTS

| | | |
|---|---|---|
| 0209787 | 7/1986 | European Pat. Off. . |
| WO 98/17762 | 10/1997 | WIPO . |

*Primary Examiner*—P. Hampton-Hightower
*Attorney, Agent, or Firm*—Oblon, Spivak, McClelland, Maier & Neustadt, P.C.

[57] ABSTRACT

Amphoteric amine based polymers having a net cationic charge, wherein the polymers are obtained by reacting (a) at least one amine with (b) at least one crosslinking agent, in a molar ratio of (a):(b) of from 2:1 to 1:1.5 and (c) reacting the condensation products of (a) and (b), which are free of anionic groups, with an anionic group containing an alkylating agent or oxidizing their tertiary nitrogen atoms to N-oxides in such an amount that the resulting polymers still have a net cationic charge, and a process for the production of amphoteric amine based polymers having anet cationic charge by reacting the compounds of (a), (b) and (c) the amphoteric amine based polymers may be used as additives in detergents.

19 Claims, No Drawings

AMPHOTERIC AMINE BASED POLYMERS HAVING A NET CATIONIC CHARGE AND PROCESS FOR THEIR PRODUCTION

Under Title 35 U.S.C. 119(e), this Application claims the benefit of Provisional Application Ser. No. 60/058,931, filed Sep. 15, 1997 and of Provisional Application Ser. No. 60/058,810, filed Sep. 15, 1997.

DESCRIPTION

1. Technical Field

The present invention relates to amphoteric amine based polymers having a net cationic charge and to a process for their production.

2. Background of the Invention

EP-B-0,209,787 relates to a process for the aftertreatment of dyeings with reactive dyes on cellulose fiber materials with an aqueous solution of condensates which are obtained by first reacting piperazine, bis-1,4-aminopropylpiperazine, 1-aminoethylpiperazine, 2-hydroxyethylpiperazine or 1-methylpiperazine or mixtures thereof with a crosslinking agent selected from ethylene chloride, epihalohydrin, propylene chloride, 1,3-dichloro-2-hydroxypropane, bisepoxybutane, 1,4-dichlorobutane or a mixture thereof, in a molar ratio of from 1:0.5 to 1:1.1 and then benzylating the condensation products to such an extent that 15 to 90% of the tertiaty nitrogen atoms in the condensation products are quaternized.

The use of polycationic condensates as color transfer inhibiting and color release reducing additive to detergents and to fabric conditioners is known from WO-A-98/17762. These water-soluble polycationic condensates are obtained by condensing for instance piperazine, alkylpiperazines, 1,4-bis-(3-aminopropyl)piperazine, imidazole, alkylimidazoles or their mixtures with a crosslinking agent selected from alkylene dihalides, epihalohydrines and/or bisepoxides. At least 25%, preferably at least 50% of the amino groups of the condensation products may be quaternized.

The cationic condensation products described above have color-fixing properties and more or less additionally fix soil from the wash liquor on the textile material during the wash. Moreover, many of the said cationic condensation products are not stable in detergents which contain a bleaching agent. It is therefore the object of the invention to provide new cationic polymers which are stable against beaching agents containing detergents and which have a better wash performance.

We have found that this objective is achieved with amphoteric amine based polymers having a net cationic charge wherein the polymers are obtained by reacting (a) at least one amine selected from the group consisting of linear alkylamines, branched alkylamines, cycloalkylamines, alkoxyamines, amino alcohols, cyclic amines containing at least one nitrogen atom in a ring structure, alkylenediamines, polyetherdiamines, polyalkylenepolyamines, mixtures of one of the said amines with at least one amino acid or a salt thereof, reaction products of the said amines with at least one anionic group containing alkylating agent wherein per mole of NH group of the amines of from 0.04 to 0.6 moles of the anionic group containing alkylating agent is reacted, and mixtures thereof, with (b) at least one crosslinking agent selected from the group consisting of epihalohydrins, bishalohydrins of diols, bis-(halohydrins) of polyalkylene glycols, bis-(halohydrins) of polytetrahydrofurane, alkylene dihalides, alkylene trihalides, bisepoxides, triepoxides, tetraepoxides, and mixtures thereof, in a molar ratio of (a):(b) of from 2:1 to 1:1.5 and (c) reacting the condensation products of (a) and (b) which are free of anionic groups with an anionic group containing alkylating agent or oxidizing their tertiary nitrogen atoms to N-oxides in such an amount that the resulting polymers still have a net cationic charge. The above objective is also achieved with a process for the production of amphoteric amine based polymers having a net cationic charge which comprises reacting (a) at least one amine selected from the group consisting of linear alkylamines, branched alkylaines, cycloalkylamines, alkoxyamines, amino alcohols, cyclic amines containing at least one nitrogen atom in a ring structure, alkylenediamines, polyetherdiamines, polyalkylenepolyamines, mixtures of one of the said amines with at least one amino acid or a salt thereof, reaction products of the said amines with at least one anionic group containing alkylating agent wherein per mole of NH group of the amines of from 0.04 to 0.6 moles of the anionic group containing alkylating agent is reacted, and mixtures res thereof, with (b) at least one crosslinking agent selected from the group consisting of epihalohydrins, bishalohydrins of dials, bis-(halohydrins) of polyalkylene glycols, bis-(halohydrins) of polytetrahydrofurane, alkylene dihalides, alkylene trihalides, bisepoxides, triepoxides, tetraepoxides, and mixtures thereof, in a molar ratio of (a):(b) of from 2:1 to 1:1.5 and (c) reacting the condensation products of (a) and (b) which are free of anionic groups with an anionic group containing alkylating agent or oxidizing their tertiary nitrogen atoms to N-oxides in such an amount that the resulting polymers still have a net cationic charge.

The compounds of group (a) can be used alone or in mixture with one another. Specific examples of the said amines are methylamine, ethylamine, propylamine, butylamine, pentylamine, hexylamine, heptylamine, octylamine, 2-ethylhexylamine, isooctylamine, nonylamine, isononylamine, decylanine, undecylamine, dodecylaminetridecylamine, stearylamine, palmitylamine, dimethylamine, diethylamine, dipropylamine, dibutylamine, dipentylamine, dihexylamine, bis-(2-ethyl-hexyl)amine, ditridecylamine, N-methylbutylamine, N-ethylbutylarine, piperidine, morpholine, pyrrolidine, 2-methoxyethylamine, 2-ethoxyethylamine, 3-methoxypropylamine, 3-ethoxypropylamine, 3-[(2-ethylhexyl)oxy]-1-propaneamine, 3-[(2-methoxyethoxy]-1-propaneamine, 2-methoxy-N-(2-methoxyethyl)ethanamine, 2-aminoethanol, 3-amino-1-propanol, 1-amino-2-propanol, 2-(2-aminoethoxy)ethanol, 2-[(2-aminoethyl)amino] ethanol, 2-(methylamino)ethanol, 2-(ethylamino)ethanol, 2-(butylamino)ethanol, diethanolamine, 3-[(2-hydroxyethyl)amino]1-propanol, diisopropanolamine, bis-(2-hydroxyethyl)aminoethylamine, bis-(2-hydroxypropyl) aminoethylamine, bis-(2-hydroxyethyl)aminopropylamine, bis-(2-hydroxypropyl)aminopropylamine, cyclopentylamine, cyclohexylamine, N-methylcyclohexylamine, N-ethylcyclohexylamine, dicyclohexylamine, ethylenediamine, propylenediamine, butylenediamine, neopentyldiamine, hexamethylenediamine, octamethylenediamine, isophoronediamine, 4,4'-methylenebiscyclohexylamine, 4,4'-methylenebis(2-methylcyclohexylamine), 4,7-dioxadecyl-1,10-diamine, 4,9-dioxadodecyl-1,12-diamine, 4,7,10-trioxatridecyl-1,13-diamine, 2-(ethylamino)ethylamine, 3-(methylamino)propylamine, 3-(cyclohexylamino)propylamine, 3-aminopropylamine, 2-(diethylanino)ethylamine, 3-(dimethylamino)propylamine, 3-(diethylamino)propylamine, dipropylenetriamine, tripropylenetetramine, N,N-bis-(aminopropyl)methylamine, N,N-bis-(aminopropyl)ethylamine, N,N-bis-(aminopropyl)hexylamine, N,N-bis-(aminopropyl)octylamine, 1,1-dimethyldipropylenetriamine, N,N-bis-(3-dimethylaminopropyl)amine, N,N"-1,2-ethanediylbis-(1,3-propanediamine), diethylenetriamine, bis-(aminoethyl)ethyleneditine, bis-(aminopropyl)ethylenediamine, bis-(hexamethylene)triamine, N-(aminoethyl)hexamethylenediamine, N-(aminopropyl)hexamethylenediamine, N-(aminopropyl)ethylenediamine, N-(aminoethyl)butylenediamine, N-(aminopropyl)butylenediamine, bis-(aminoethyl)hexamethylenediamine, bis-(aminopropyl)hexamethylenediamine, bis-(aminoethyl)butylenediamine, bis-(aminopropyl)butylenediamine, 4-aminomethyloctane-1,8-diamine, and N,N-diethyl-1,4-pentanediamine.

Cyclic amines containing at least one nitrogen atom in a ring structure are for example monoaminoalkylpiperazines, bis(aminoalkyl)piperazines, monoaminoalkylimidazoles, aminoalkylmorpholines, aminoalkylpiperidines and aminoalkylpyrrolidines. The monoaminoalkylpiperazines are for example 1-(2-aminoethyl)piperazine and 1-(3-aminopropyl)piperazine. Preferred monoaminoalkylimidazoles have 2 to 8 carbons atoms in the alkyl group. Examples of suitable compounds are 1-(2-aminoethyl)imidazole and 1-(3-aminopropyl)imidazole that. Suitable bis(aminoalkyl)piperazines are for example 1,4-bis(-2-aminoethyl)piperazine and 1,4-bis(3-aminopropyl)-piperazine. Preferred aminoalkylmorpholines are aminoethylmorpholine and 4-(3-aminopropyl)-morpholine. Other preferred compounds of this group are aminoethylpiperidine, aminopropylpiperidine and aminopropylpyrrolidine.

Cyclic amines with at least two reactive nitrogen atoms in the ring are for example imidazole, C-alkyl substituted imidazoles having 1 to 25 carbon atoms in the alkyl group such as 2-methylimidazole, 2-ethylimidazole, 2-propylimidazole, 2-isopropylimidazole and 2-isobutylimidazole, imidazoline, C-alkyl substituted imidazolines having 1 to 25 carbon atoms in the alkyl group and arylimidazolines such as 2-phenylimidazoline and 2-tolylimidazoline, piperazine, N-alkylpiperazines having 1 to 25 carbon atoms in the alkyl group such as 1-ethylpiperazine, 1-(2-hydroxy-1-ethyl)piperazine, 1-(2-hydroxy-1-propyl)piperazine, 1-(2-hydroxy-1-butyl)piperazine, 1-(2-hydroxy-1-pentyl)piperazine, 1-(2,3-dihydroxy-1-propyl)piperazine, 1-(2-hydroxy-3-phenoxyethyl)piperazine, 1-(2-hydroxy-2-phenyl-1-ethyl)piperazine, N,N'-dialkylpiperazines having 1 to 25 carbon atoms in the alkyl group for example 1,4-dimethylpiperazine, 1,4-diethylpiperazine, 1,4-dipropylpiperazine, 1,4-dibenzylpiperazine, 1,4-bis(2-hydroxy-1-ethyl)piperazine, 1,4-bis(2-hydroxy-1-propyl)piperazine, 1,4-bis(2-hydroxy-1-butyl)piperazine, 1,4-bis(2-hydroxy-1-pentyl)piperazine, and 1,4-bis(2-hydroxy-2-phenyl-1-ethyl)piperazine. Other cyclic amines with at least two reactive nitrogen atoms are melamine and benzimidazoles such as 2-hydroxybenzimidazole and 2-aminobenzimidazole.

Preferred cyclic amines with at least two reactive nitrogen atoms are imidazole, 2-methylimidazole, 4-methylimidazole and piperazine.

In a preferred embodiment of the invention the amine is selected from the group consisting of (i) at least one cyclic amine containing at least two reactive nitrogen atoms and (ii) mixtures of at least one cyclic amine containing containing at least two reactive nitrogen atoms with at least one other amine containing 1 to 6 nitrogen atoms. Examples of other amines containing 1 to 6 nitrogen atoms of which at least one is not quaternary are linear alkyl amines having 1 to 22 carbon atoms in the alkyl group, branched alkylamines, cycloalkylamines, alkoxyamines, amino alcohols, cyclic amines containing one nitrogen atom in a ring structure, alkylenediamines, polyether diamines, and polyalkylenepolyamines containing 3 to 6 nitrogen atoms.

Preferred amines that are used in mixture with at least one cyclic amine with at least two reactive nitrogen atoms are methylamine, ethylamine, propylamine, ethylenediamine, 1,4-diaminobutane, 1,2-diaminobutane, 1,3-diaminopropane, 1,2-diaminopropane, hexamethylenediamine, bishexamethylenetriamine, diethylenetriamine, dipropylenetriamine, triethylentetramine, tetraethylenepentamine, dimethylaminopropylamine and N,N-bis(3-aminopropyl)-N-methylamine.

Most preferred amines that are used in mixture with at least one cyclic amine with at least two reactive nitrogen atoms are ethylenediamine, 1,3-diaminopropane, hexamethylenediamine, dimethylaminopropylamine and N,N-bis (3-aminopropyl)-N-methylamine.

The term "reactive nitrogen atom" means that this nitrogen atom is capable of reacting with for example an alkylating agent, e.g. benzyl chloride, or with a crosslinker, e.g. ethylene chloride or epichlorohydrin and excludes quaternary nitrogen atoms which cannot react further. In accordance with the said meaning primary, secondary and tertiary amino groups contain one reactive nitrogen atom, whereas imidazole contains two.

The amines specified above can be used in mixture with at least one amino acid or a salt thereof. Examples of amino acids are glycine, alanine, aspartic acid, glutamic acid, asparagine, glutamine, lysine, arginine, threonine, 2-phenylglycine, 3-aminopropionic acid, 4-aminobutyric acid, 6-aminocaproic acid, 11-aminoundecanoic acid, iminodiacetic acid, sarcosine, 1-carboxymethylpiperazine, 1,4-bis(carboxymethyl)piperazine, 1-carboxymethylimidazole, imidazole carboxylic acid, anthranilic acid, sulfanilic acid, amidosulfonic acid, aminomethylsulfonic acid, aminoethylsulfonic acid, salts thereof, and mixtures thereof. Preferably per one mole of reactive nitrogen groups in the amines 0.1 to 2 moles of amino acids are used.

Reaction products of the said amines with at least one anionic group containing alkylating agent may be used as component (a) in the process of the invention and are contained in condensed form in the amphoteric amine based polymers having a net cationic charge. Examples of anionic group containing alkylating agents are 2-chloroacetic acid, 3-chloropropionic acid, 2-chloroethanesulfonic acid, epoxysuccinic acid, propane sultone, 3-chloro-2-hydroxypropanesulfonic acid, and mixtures thereof. Other suitable anionic group containing alkylating agents are monoethylenically unsaturated acids such as acrylic acid, methacrylic acid, maleic acid, itaconic acid, and vinylsulfonic acid. This group of alkylating agents reacts with the NH-groups of the amines via Michael addition reaction. Per mole of the NH groups of the amines 0.04 to 0.6 moles of the anionic group containing alkylating agent is used in the production of the amphoteric amine based polymers having a net cationic charge.

The amines of group (a) are reacted with at least one crosslinking agent selected from the group consisting of epihalohydrins, bishalohydrins of diols, bis-(halohydrins) of polyalkylene glycols, bis-(halohydrins) of polytetrahydrofurane, alkylene dihalides, alkylene trihalides, bisepoxides, triepoxides, tetraepoxides, and mixtures thereof, in a molar ratio of (a):(b) of from 2:1 to 1:1.5

The crosslinking agents based on compounds containing two reactive groups are preferred. Epihalohydrins are for example epichlorohydrin, epibromohydrin and epi-iodohydrin. Bis(halohydrins) of diols and bis(halohydrins) of polyalkylene glycol are for example derived from alkylene glycols and polyalkylene glycols, e.g. bis(chlorohydrins) of ethylene glycol, polyethylene glycol containing 2 to 100 ethylene oxide units, copolymers of ethylene oxide and propylene oxide, copolymers of ethylene oxide and butylene oxide, propylene glycol, polypropylene glycol containing 2 to 70 propylene oxide units, 1,2-butanediol, 1,4-butanediol, 1,2-pentanediol, 1,5-pentanediol, 1,2-hexanediol, 1,6-hexanediol, 2,2-dimethyl-1,3-propanediol, bis(hydroxyphenyl)methane, 2,2-bis(hydroxyphenyl)propane and polytetrahydrofurans having 2 to 50 tetrahydrofuran units.

Examples of alkylene dihalides which may have 2 to 6 carbon atoms in the alkylene group are 1,2-dichloroethane, 1,2-dichloropropane, 1,3-dichloropropane, 1,4-dichlorobutane, 1,6-dichlorohexane, 1,3-dichloropropane-2ol, 1,2-dichloropropane-3-ol.

The bisepoxides are obtained from bis (halohydrins)given above. The bis(halohydrins)can be converted into bisepoxides via dehydrohalogenation by treatment with a base such as sodium hydroxide or potassium hydroxide. The epoxides so obtained are bisglycidyl ethers, for example from bisepichlorohydrin ether of polyethylene glycol having 10 ethylene oxide units the bisglycidyl ether of polyethylene glycol having 10 ethylene oxide units are obtained. Another suitable bisepoxide is bisepoxybutane.

Crosslinking agents which contain more than two reactive groups alkylene trihalides such as $C_3$- to $C_{10}$-alkylene trihalides, reaction products of polyols having at least three hydroxy groups with epichlorohydrin in a molar ratio of at least 1:3 and the dehydrohalogenation products thereof, i.e. the glycidyl ethers.

The molecular weight of the crosslinkers usually does not exceed 3,000 and is preferably in the range of from 92 to 2,000.

If mixtures of (i) an amine specified above with (ii) at least one amino acid or reaction products of (i) said amines with (ii) at least one anionic group containing alkylating agent are reacted as component (a) with component (b) then amphoteric amine based polymers having a net cationic charge are directly formed. If desired, these reaction products can be alkylated with an alkylating agent free of anionic groups.

Examples of this embodiment of the invention are amphoteric amine based polymers which are obtainable by reacting
(a) (i) an amine selected from the group consisting of imidazole,
2-methylimidazole, 1-(2-aminoethylimidazole), 1-(3-aminopropylimidazole), benzimidazole, piperazine, 1-(2-aminoethyl)piperazine, 1,4-bis(2-aminoethyl)piperazine, 1-(3-aminopropyl)piperazine, 1,4-bis(3-aminopropyl)piperazine, mixtures thereof, and mixtures of (i) at least one of the said amines with (i') N-alkylimidazoles with 1 to 25 carbon atoms in the alkyl group, 1-(2-hydroxyethyl)imidazole, 1-(2-hydroxypropyl)imidazole, quinoline, isoquinoline, cyclic secondary amines with 4 to 8 carbon atoms in the ring, and/or acyclic secondary amines with 2 to 25 carbon atoms,
with
(ii) at least one amino acid selected from the group consisting of glycine, alanine, aspartic acid, glutamic acid, asparagine, glutamine, lysine, arginine, threonine, 2-phenylglycine, 3-aminopropionic acid, 4-aminobutyric acid, 6-aminocaproic acid, 11-aminoundecanoic acid, iminodiacetic acid, sarcosine, 1-carboxymethylpiperazine, 1,4-bis(carboxymethyl)piperazine, 1-carboxymethylimidazole, imidazole carboxylic acid, anthranilic acid, sulfanilic acid, amidosulfonic acid, aminomethylsultonic acid, aminoethylsulfonic acid, salts thereof, and mixtures thereof
and subsequently with
(b) at least one crosslinking agent selected from the group consisting of 1,2-dichloroethane, 1,2-dichloropropane, 1,3-dichloropropane, 1,3-dichloro-2-hydroxypropane, 1,4-dichlorobutane, 1,6-dichlorohexane, epichlorohydrin, bisepoxibutane, bisglycidylether of 4,4'-dihydroxydiphenyl-dimethylmethane, bishalohydrins of C2- to C8-diols, bisglycidyl ethers of C2- to C18-diols, bisglycidyl ethers of polyalkylene glycols, and mixtures thereof.

As indicated above, amphoteric amine based polymers are also directly abtainable by reacting
(a)
(i) an amine selected from the group consisting of imidazole, 2-methylimidazole, 1-(2-aminoethylimidazole), 1-(3-aminopropylimidazole), benzimidazole, piperazine, 1-(2-aminoethyl)piperazine, 1,4-bis(2-aminoethyl)piperazine, 1-(3-aminopropyl)piperazine, 1,4-bis(3-aminopropyl)piperazine, mixtures thereof, and mixtures of (i) at least one of the said amines with (i') N-alkylimidazoles with 1 to 25 carbon atoms in the alkyl group, 1-(2-hydroxyethyl)imidazole, 1-(2-hydroxypropyl)imidazole, quinoline, isoquinoline, cyclic secondary amines with 4 to 8 carbon atoms in the ring, and acyclic secondary amines with 2 to 25 carbon atoms,
with
(ii) an anionic group containing alkylating agent selected from the group consisting of 2-chloroacetic acid, 2-chloroethanesulfonic acid, vinylsulfonic acid, acrylic acid, methacrylic acid, maleic acid, clioropropionic acid, epoxysuccinic acid, propane sultone, 3-chloro-2-hydroxypropanesulfonic acid, salts thereof and mixtures thereof
and crosslinking with
(b) at least one crosslinking agent selected from the group consisting of 1,2-dichloroethane, 1,2-dichloropropane, 1,3-dichloropropane, 1,3-dichloro-2-hydroxypropane, 1,4-dichlorobutane, 1,6-dichlorohexane, epichlorohydrin, bisepoxibutane, bisglycidylether of 4,4'-dihydroxydiphenyl-dimethylmethane, bishalohydrins of C2- to C8-diols, bisglycidyl ethers of C2- to C18-diols, bisglycidyl ethers of polyalkylene glycols, and mixtures thereof.

These amphoteric amine based polymers may additionally be alkylated with an alkylating agent free of anionic groups. By this procedure primary, secondary and/or tertiary nitrogen atoms in the amphoteric amine based polymers are quaternized with the effect that the cationic charge of the amphoteric amine based polymers is augmented.

If the above condensation products of compounds (a) and (b) are not net cationic at acidic of alkyline pH, then the alkylation with an alkylating agent free of anionic groups is necessary.

Examples of this embodiment of the invention are ampho-teric amine based polymers which are obtainable by reacting (a)
- (i) an amine selected from the group consisting of imidazole, 2-methylimidazole, 1-(2-aminoethylimidazole), 1-(3-aminopropylimidazole), benzimidazole, piperazine, 1-(2-aminoethyl) piperazine, 1,4-bis(2-aminoethyl)piperazine, 1-(3-aminopropyl) piperazine, 1,4-bis(3-aminopropyl) piperazine, mixtures thereof, and mixtures of (i) at least one of the said amines with (i') N-alkylimidazoles with 1 to 25 carbon atoms in the alkyl group, 1-(2-hydroxyethyl)imidazole, 1-(2-hydroxypropyl)imidazole, quinoline, isoquinoline, cyclic secondary amines with 4 to 8 carbon atoms in the ring, and/or acyclic secondary amines with 2 to 25 carbon atoms, with
- (ii) an anionic group containing alkylating agent selected from the group consisting of 2-chloroacetic acid, 2-chloroethanesulfonic acid, vinylsulfonic acid, acrylic acid, methacrylic acid, maleic acid, chloropropionic acid, epoxysuccinic acid, propane sultone, 3-chloro-2-hydroxypropanesulfonic acid, salts thereof and mixtures thereof and subsequently with
- (b) a crosslinking agent selected from the group consisting of 1,2-dichloroethane, 1,2-dichloropropane, 1,3-dichloropropane, 1,3-dichloropropane-2-ol, 1,4-dichlorobutane, 1,6-dichlorohexane, epichlorohydrin, bisepoxybutane, bisglycidyl ether of 4,4'-dihydroxydiphenyl-dimethylmethane, bishalohydrins of C2- to C8-diols, bisglycidyl ethers of C2- to C18-diols, bisglycidyl ethers of polyalkylene glycols, and mixtures thereof, and
- (c) alkylating the condensation product of (a) and (b) with an alkylating agent free of acid groups selected from the group consisting of dimethyl sulfate, diethyl sulfate, ethylene oxide, propylene oxide, butylene oxide, styrene oxide, methyl chloride, ethylchloride and benzyl chloride in such an amount that the resulting polymers have a net cationic charge in both an acid and an alkaline medium.

The reaction products of compounds (a) and (b) which do not contain an anionic group are further reacted with an anionic group containing alkylating agent. Preferred ampho-teric amine based polymers are obtainable by reacting (a) piperazine, 1-(2-hydroxyethyl)piperazine, 1-(2-aminoethyl)piperazine, imidazole, N-alkylimidazoles having 1–25 carbon atoms in the alkyl group, N-arylimidazoles, N-benzylimidazole and mixtures thereof with
- (b) a crosslinking agent selected from the group consisting of 1,2-dichloroethane, 1,2-dichloropropane, 1,3-dichloropropane, 1,3-dichloropropane-2-ol, 1,4-dichlorobutane, 1,6-dichlorohexane, epichlorohydrin, bisepoxybutane, bisglycidyl ether of 4,4'-dihydroxydiphenyl-dimethylmethane, bishalohydrins of C2- to C8-diols, bisglycidyl ethers of C2- to C18-diols, bisglycidyl ethers of polyalkylene glycols, and mixtures thereof, and
- (c) introducing anionic groups into the condensation products of (a) and (b) by reacting them with an anionic group containing alkylating agent selected from the group consisting of 2-chloroacetic acid, 2-chloroethanesulfonic acid, chloropropicnic acid, epoxysuccinic acid, propane sultone and 3-chloro-2-hydroxypropane sulfonic acid.

Another method of introducing an anionic group into these condensation products consists in oxidizing their tertiary nitrogen atoms to N-oxides. Suitable oxidizing agents are for example hydrogen peroxide, tertiary butyl peroxide, peracids, perborates, and percarbonates. Hydrogen peroxide is preferably used as oxidizing agent. The oxidation is carried out to such a degree that the amine based amphoteric polymers obtained still have a net cationic charge. Preferred amphoteric amine based polymers of this type are obtainable by reacting (a) an amine selected from the group consisting of imidazole, 2-methylimidazole, 1-(2-aminoethylimidazole), 1-(3-aminopropylimidazole), benzimidazole, piperazine, 1-(2-aminoethyl) piperazine, 1,4-bis(2-aminoethyl)piperazine, 1-(3-aminopropyl)piperazine, 1,4-bis(3-aminopropyl) piperazine, mixtures thereof, and mixtures of (i) at least one of the said amines with (i') N-alkylimidazoles with 1 to 25 carbon atoms in the alkyl group, 1-(2-hydroxyethyl)imidazole, 1-(2-hydroxypropyl) imidazole, quinoline, isoquinoline, cyclic secondary amines with 4 to 8 carbon atoms in the ring, and acyclic secondary amines with 2 to 25 carbon atoms with
- (b) a crosslinking agent selected from the group consisting of 1,2-dichloroethane, 1,2-dichloropropane, 1,3-dichloropropane, 1,3-dichloropropane-2-ol 1,4-dichlorobutane 1, 6-dichiorohexane, epichlorohydrin, bisepoxybutane, bisglycidyl ether of 4,4'-dihydroxydiphenyl-dimethylmethane, bishalohydrins of C2- to C8-diols, bisglycidyl ethers of C2- to C18-diols, bisglycidyl ethers of polyalkylene glycols, and mixtures thereof, and
- (c) introducing anionic groups into the condensation products of (a) and (b) by oxidizing their tertiary nitrogen atoms to N-oxides in such an amount that the resulting polymers still have a net cationic charge.

The most preferred amphoteric amine based polymers are obtainable by reacting (a) imidazole with an acid group containing alkylating agent consisting of 2-chloroacetic acid, 3-chloro-2-hydroxypropanesulfonic acid, and sodium salts thereof, in a molar ratio of from 1:0.04 to 1:0.6 and (b) condensing the reaction product obtained with epichlorohydrin using per mole of condensed imidazole in the reaction product 0.5 to 1.2 moles of epichlorohydrin.

Another group of most preferred amphoteric amine based polymers is obtained by reacting (a) an amine selected from mixtures of imidazole with piperazine in a molar ratio of 1:0.1 to 1:10 with (b) epichlorohydrin in a molar ratio of (a) to (b) of from 1:0.5 to 1:1.2 and (c) reacting the condensation product of (a) and (b) with an acid group containing alkylating agent selected from the group consisting of chloroacetic acid, 3-chloro-2-hydroxypropanesulfonic acid, sodium salts thereof, and mixtures thereof, using per mole of condensed piperazine in the condensation product from 0.1 to 2 moles of the alkylating agent.

Another group of most preferred amphoteric amine based polymers is obtained by reacting
- (a) an amine selected from mixtures of imidazole with piperazine in a molar ratio of from 1:0.1 to 1:10 with
- (b) epichlorohydrin in a molar ratio of (a):(b) of from 1:0.5 to 1:1.2 and
- (c) reacting the condensation product of (a) and (b) with an oxidizing agent selected from the group of hydrogenperoxide, peracetic acid, sodium perborate, sodium percarbonate, using per mole of piperazine condensed in the condensation product from 0.1 to 2.2 moles of the oxidizing agent.

The amphoteric amine based polymers are produced by the process described above. In a preferred process of the invention the amine is selected from the group consisting of (i) at least one cyclic amine containing at least two reactive nitrogen atoms and (ii) mixtures of at least one cyclic amine containing at least two reactive nitrogen atoms with at least one other amine containing 1 to 6 nitrogen atoms. The components (a), (b) and (c) which are reacted in the process according to the invention are described above. In a preferred embodiment of the invention the following compounds are reacted according to the invention under formation of amphoteric amine based polymers having a net cationic charge:

Reacting
- Imidazole, piperazine and epichlorohydrin in a molar of 1:1:2 and thereafter quaternizing 25 to 100% of the nitrogen atoms of the condensed piperazine with the sodium salt of 2-chloroacetic acid
- imidazole, piperazine and epichlorohydrin in a molar ratio of 1:2:3 and thereafter quaternizing 30 to 70% of the nitrogen atoms of the condensed piperazine with the sodium salt of 2-chloroacetic acid
- imidazole, piperazine and epichlorohydrin in a molar ratio of 1:3:4 and thereafter quaternizing 23 to 75% of the nitrogen atoms of the condensed piperazine with 2-chloroacetic acid
- imidazole, piperazine and epichlorohydrin in a molar ratio of 1:5:6 and thereafter quaternizing 40 to 51% of the nitrogen atoms of the condensed piperazine with 2-chloroacetic acid
- imidazole, piperazine and epichlorohydrin in a molar ratio of 1:10:11 and thereafter quaternizing 26 to 51% of all nitrogen atoms of the condensed piperazine with 2-chloroacetic acid
- piperazine and epichlorohydrin in a molar ratio of 1:1 and oxidizing all nitrogen atoms of the condensed piperazine with 50% strength by weight hydrogen peroxide
- imidazole, piperazine and epichlorohydrin in a molar ratio of 1:3:4 and thereafter oxidizing 50 to 100 of the nitrogen atoms of the condensed piperazine in the condensation product with 50% strength hydrogen peroxide
- imidazole, piperazine and epichlorohydrin in a molar ratio of 1:5:6 and thereafter completely oxidizing the condensation product with 50% strength by weight hydrogen peroxide
- imidazole, piperazine and epichlorohydrin in a molar ratio of 1:10:11 and completely oxidizing the condensation product with hydrogen peroxide
- turbine, imidazole and epichlorohydrin in a molar ratio of 1:0.5:1.5 and thereafter quaternization of the condensation product with up to 1 mol of dimethyl sulfate.

To produce the amphoteric amine based polymers of the invention compounds (a) and (b) are reacted in a molar ratio of (a):(b) of from 2:1 to 1:1.5. The reaction is preferably carried out in a solvent at temperatures of from 20 to 120° C. If the reaction temperature is above the boiling point of the solvent, then the reaction is carried out in a pressure-tight apparatus under elevated pressure. Suitable solvents are alcohols, e.g. methanol, ethanol, n-propanol, isoparnol, and butanols, ethers such as dimethyl glycol or tetrahydrofuran, and water, which is the preferred solvent.

The condensation products free of anionic groups (this means that the amine was neither reacted with an anionic group containing alkylating agent nor used as a mixture with amino acids before it was condensed with a crosslinking agent) are alkylated with an anionic group containing alkylating agent and/or their tertiary nitrogen atoms are oxidized to N-oxides. The alkylation is preferably carried out in a solvent. The solvents used in the condensation reaction of the components (a) and (b) can also be used in the alkylation and oxidation process. The preferred solvent is water. In case of gaseous alkylating agents like e.g. ethylene oxide and propylene oxide the reaction is carried out in an autoclave under elevated pressure. The pressure applied can be varied in a broad range and is typically in the range of from 1–50 bar, preferably 1.5 to 20 bar. The alkylation of condensation products of (a) and (b) which already contain anionic groups with an alkylating agent free of acid groups is carried out correspondingly.

To produce amphoteric amine based polymers according to the invention in an embodiment of the invention the condensation products of components (a) and (b) are oxidized with oxidizing agents converting tertiary amine groups into N-oxide groups. The oxidation is preferably carried out in a solvent at temperatures of from 20 to 120° C., preferably from 30 to 80° C. The preferred solvent is water.

The balance of cationic and anionic groups in the amphoteric amine based polymers is so adjusted that the amphoteric polymer has a net cationic charge. A net cationic charge exists in an aqueous solution of the polymer at least at an acidic pH and preferably even at a pH above 7. The preferred amphoteric amine based polymers have a net cationic charge in an aqueous solution even at pH of from 7–12, preferably 7 to 10.5. Most preferred are amphoteric amine based polymers having a net cationic charge above 9. The cationic charge of the amphoteric polymers can be measured by polyelectrolyte titration or by determining the electrophoretic mobility of latices having the amphoteric polymers absorbed.

The amphoteric amine based polymers having a net cationic charge are soluble in water and in alcohols such as methanol or ehtanol. The molecular weight of the amphoteric amine based polymers is of from about 200 to 1 million, preferably from 200 to 500,000 and most preferred from 500 to 50,000 (measured by gel permeation chromatography).

The amphoteric amine based polymers having a net cationic charge can be used as additives in detergents in an amount of from 0.1 to 5% by weight. Laundering or treating of fabrics and textiles in aqueous washing or treating solutions which contain an effective amount of the cyclic amine based polymer of the invention, followed by rinsing and drying, imparts fabric appearance benefits to the fabric and textile articles so treated. Such benefits can include improved overall appearance, pill/fuzz reduction, antifading, improved abrasion resistance, and/or enhanced softness.

The content of primary, secondary and tertiary amino groups and quaternary ammonium groups in the polymers can be determined by several methods, e.g. 13C-NMR spectroscopy, 1H-NMR spectroscopy, infrared spectroscopy, polyelectrolyte titration and potentiometric titration.

The percentages in the Examples are by weight. The K values were determined according to Fikentscher, Cellulose-Chemie Vol. 13, 58–64 and 71–74 (1932) in 5% strength aqueous solution of sodium chloride, a polymer concentration of 1% by weight and at a temperature of 25° C.

The molecular weights were measured by gel permeation chromatography (GPC) using the following combination of separating columns:

(1) waters ultrahydrogel 500
(2) Waters Ultrahydrogel 250
(3) Waters Ultrahydrogel 250
(4) Waters Ultrahydrogel 120.

The temperature of the columns was 35° C. The eluant consisted of a mixture of a 0.2 molar acetic acid and a 0.3 molar aqueous potassium chloride solution, the flow rate was 0.5 ml/min. The calibration was carried out with narrowly distributed standards of pullulan obtained from Polymer Laboratories LTD with molecular weights M=5,800 to 853,000 and maltohexose (M=992), saccharose (M=342) and glucose (M=180). Differential refractometer ERC 7510 (ERMA) was used as detector.

The cationic charge of the amphoteric amine based polymers having a net cationic charge was determined by polyelectrolyt titration in milli-equiv/g of the polymer.

EXAMPLE 1

A solution of 92.6 g (1.36 moles) of imidazole in 140.5 g of water was heated to 50° C. and combined in the course of 10 minutes with an aqueous solution of 8.2 g (0.07 moles) of the sodium salt of 2-chloroacetic acid in 50 g of water. The solution is then heated at 65° C. until all of the sodium salt of 2-chloroacetic acid has reacted as can be analytically determined by the chloride ion content of the solution. 5.6 g (0.07 moles) of a 50% strength by weight aqueous solution of sodium hydroxide were added and 89.7 g (0.97 moles) of epichlorohydrin were added while stirring within 30 minutes so that the temperature of the reaction mixture could be kept in the range of from 55 to 65° C. After the addition of epichlorohydrin the reaction mixture was heated to 80° C. and stirred for 4 hours at this temperature. After this period no more alkylating agent could be detected. 377.7 g of a yellowish aqueous solution of an amphoteric amine based polymer having a net cationic charge of 4.2 mequiv/g polymer were obtained. The solution had a pH of 6.97 and contained 50.3% of water, 0.06% of glycolic acid and less than 0.05% of 2-chloroacetic acid. The molecular weight of the polymer was Mn=700, Mw=1,460 and Mw/Mn=2.1.

EXAMPLE 2

According to the procedure given in Example 1, 92.6 g (1.36 moles) of imidazole, 16.3 g (0.14 moles) of the sodium salt of 2-chloroacetic acid, 11.2 g (0.14 moles) of a 50% strength by weight aqueous solution of sodium hydroxide and 86.1 g (0.93 moles) of epichlorohydrin were reacted. 386.3 g of a yellowish aqueous solution of an amphoteric amine based polymer having a net cationic charge of 3.4 mequiv/g polymer were obtained. The solution had a pH of 7.10 and contained 49.6% of water, 0.1% glycolic acid and less than 0.05% of 2-chloroacetic acid. The molecular weight of the polymer was Mn=0.650, Mw=1,320 and Mw/Mn=2.0.

EXAMPLE 3

According to the procedure given in Example 1, 92.6 g (1.36 moles) of imidazole dissolved in 122.6 g of water, 39.6 g (0.34 moles) of the sodium salt of 2-chloroacetic acid dissolved in 100 g of water, 27.2 g (0.34 moles) of a 50% strength by weight aqueous solution of sodium hydroxide and 76.8 g (0.83 moles) of epichlorohydrin were reacted. 386.3 g of a yellowish aqueous solution of an amphoteric amine based polymer having a net cationic charge of 2.8 mequiv/g were obtained. The solution had a pH of 7.82 and contained 53.4% of water, 0.2% of glycolic acid and less than 0.05% of 2-chloroacetic acid. The molecular weight of the polymer was Mn=540, Mw=1,060 and Mw/Mn=2.0.

EXAMPLE 4

Example 1 was repeated with the exceptions that 68.1 g (1.0 mole) of imidazole dissolved in 54.9 g of water, 72.0 g (0.6 moles) of the sodium salt of 2-chloroacetic acid dissolved in 150 g of water, 48.0 g (0.6 moles) of a 50% strength by weight solution of sodium hydroxide and 64.8 g (0./moles) of epichlorohydrin were reacted. 446.4 g of a dark yellow aqueous solution of an amphoteric amine based polymer having a net cationic charge of 3.2 mequiv/g were obtained. The solution had a pH of 12.29 and contained 48.2% of water, 0.5% of glycolic acid and less than 0.05% of 2-chloroacetic acid. The molecular weight of the polymer was Mn=740, Mw=1,690 and Mw/Mn=2.3.

EXAMPLE 5

Example 1 was repeated with the exceptions that 71.5 g (1.05 moles) of imidazole dissolved in 116.3 g of water, 40.8 g (0.34 moles) of the sodium salt of 2-chloroacetic acid dissolved in 100 g of water, 27.2 g (0.24 moles) of a 50% strength by weight solution of sodium hydroxide and 76.8 g (0.83 moles) of epichlorohydrin were reacted. 427.6 g of a yellow aqueous solution of an amphoteric amine based polymer having a net cationic charge of 3.7 mequiv/g and a K value of 9.5 were obtained. The solution had a pH of 11.62 and contained 54.2% of water, 0.3% of glycolic acid and less than 0.05% of 2-chloroacetic acid. The molecular weight of the polymer was Mn=1,050, Mw=2,380 and Mw/Mn=2.3.

EXAMPLE 6

68.1 g (1 mole) of imidazole were dissolved in 73.6 g of water and heated to a temperature of 50° C. As soon as this temperature had been reached, a solution of 73.5 g (0.34 moles) of the sodium salt of 3-chloro-2-hydroxypropanesulfonic acid in 150 g of water and 27.2 g (0.34 moles) of a 50% strength by weight aqueous solution of sodium hydroxide were simultaneously added with stirring over a period of 25 minutes. The reaction mixture was then stirred at a temperature of from 65 to 90° C. until all of the sodium salt of 3-chloro-2-hydroxypropanesulfonic acid had reacted as determined analytically by measuring the concentration of chloride ions in the solution. The solution was cooled to 55° C. and 76.8 g (0.83 moles) of epichlorohydrin were introduced within 30 minutes at such a rate that the temperature of the reaction mixture could be kept at 55° C. After completion of the epichlorohydrin addition the reaction mixture was heated to 80° C. and stirred for 4 hours at this temperature. After this period no more alkylating agent could be detected in the reaction mixture. 461.3 g of a clear yellow aqueous solution of an amphoteric amine based polymer having a net cationic charge of 2.9 mequiv/g polymer and a K value of 10.0 were obtained. The solution had a pH of 11.55 and contained 52.4% of water. The molecular weight of the polymer was Mn=1,800, Mw=3,490 and Mw/Mn=1.95.

EXAMPLE 7

Example 6 was repeated with the exception that 34.1 g (0.5 moles) of imidazole dissolved in 31.3 g of water, 64.8 g (0.35 moles) of the sodium salt of 3-chloro-2-hydroxypropanesulfonic acid dissolved in 100 g of water, 24.0 g (0.3 moles) of a 50% strength by weight aqueous solution of sodium hydroxide and 32.4 g (0.35 moles) of epichlorohydrin were reacted. 284.1 g of a clear yellow aqueous solution of an amphoteric amine based polymer having a net cationic charge of 3.3 mequiv/g polymer and a K value of 7.6 were obtained. The solution had a pH of 11.92 and contained 51.7% of water. The molecular weight of the polymer was Mn=1,100, Mw=1,990 and Mw/Mn=1.80.

EXAMPLE 8

137.6 g (2.0 moles) of imidazole and 173.6 g (2.0 moles) of piperazine were dissolved in 681.2 g of water. The aqueous solution was then heated to 50° C. At this temperature 370 g (4.0 mole) of epichlorohydrin were added while stirring within 1 hour at a temperature of from 50–60° C. After the epichlorohydrin addition the reaction mixture was heated to 80° C. and stirred at this temperature for 5 hours. A sample of the reaction mixture was then tested for alkylating substances (epichlorohydrin). No more epichlorohydrin could be detected. The reaction mixture was cooled to room temperature.

250 g of the reaction mixture described above were placed in a flask fitted with a stirrer and a reflux condenser. The pH of the reaction mixture was adjusted to 8.1 by the addition of a 25% strength by weight aqueous solution of sodium hydroxide. The contents of the flask were heated to 50° C. At this temperature 53.5 g (0.223 moles) of a 50% aqueous solution of the sodium salt of 2-chloroacetic acid were added within 70 minutes with stirring. The reaction mixture was then stirred for 2 hours at 50° C., then heated to 70° C. and stirred for 3 hours at this temperature and thereafter kept for 2 hours at 90–100° C. while keeping its pH at 8 by the addition of a 25% strength by weight aqueous solution of sodium hydroxide. After cooling to room temperature a yellowish aqueous solution of an amphoteric polymer having a net cationic charge of 3.4 mequiv/g polymer and a K value of 22.0 was obtained. The solution had a pH of 9.9 and contained 61.8% of water. The molecular weight of the polymer was Mn=2,500, Mw=27,500 and Mw/Mn=10.8.

EXAMPLE 9

Example 8 was repeated with the exceptions that 137.6 g (2.0 moles) of imidazole, 173.6 g (2.0 moles) of piperazine dissolved in 681.2 g of water were reacted with 370 g (4.0 moles) of epichlorohydrin. 250 g of the reaction mixture so obtained were then quaternized with 110.4 g (0.446 moles) of a 50% strength by weight aqueous solution of the sodium salt of 2-chloroacetic acid by first stirring the reaction mixture for 14 hours at 50–60° C. and thereafter for 2 hours at 90–100° C. After cooling to room temperature a yellow aqueous solution of an amphoteric polymer having a net cationic charge of 2.6 mequiv/g polymer and a K value of 15.7 was obtained. The solution had a pH of 9.8 and contained 56.9% of water. The molecular weight of the amphoteric polymer was Mn=1,550, Mw=13,000 and Mw/Mn=8.4.

EXAMPLE 10

Example 8 was repeated with the exceptions that 68.8 g (1.0 mole) of imidazole, 260.6 g (3.0 mole) piperazine dissolved in 700.2 g of water were reacted with 370 g (4.0 moles) of epichlorohydrin. 250 g of the reaction mixture so obtained were then quaternized with 77.0 g (0.321 moles) of a 50% strength by weight aqueous solution of the sodium salt of 2-chloroacetic acid by stirring the reaction mixture for 4 hours at 70° C. An aqueous solution of an amphoteric polymer having a net cationic charge of 1.5 mequiv/g polymer and a K value of 16.5 was obtained. The solution had a pH of 8.59 and contained 54.7% of water.

EXAMPLE 11

137.6 g (2.0 moles) of imidazole, 173.6 g (2.0 moles) of piperazine dissolved in 681.2 g of water were reacted with 370 g (4.0 moles) of epichlorohydrin as specified in Example 8. 52.8 g (0.733 moles) of a 47.2% strength by weight aqueous solution of hydrogen peroxide were added at a temperature of 40° C. within 3 hours to a sample of 224 g of the said reaction product which contained 0.666 moles of tertiary nitrogen atoms from the piperazine (these nitrogen atoms can be oxidized). After standing overnight the reaction mixture was stirred at 40–60° C. until the theoretical amount of hydrogen peroxide had been consumed. The excess of hydrogen peroxide was destroyed by the addition of Pt/C. After filtration of the reaction mixture 252.4 g of an amphoteric amine based polymer having a net cationic charge of 2.7 were obtained. The aqueous solution had pH of 3.29 and contained 55.2% of water. The amphoteric polymer had a molecular weight Mn=400, Mw=1,440 and Mw/Mn=3.6.

EXAMPLE 12

68.8 g (1 mole) of imidazole, 260.6 (3 moles) of piperazine dissolved in 700.2 g of water were reacted according to the procedure given in Example 8 with 370 g (4.0 moles) of epichlorohydrin. A sample of 237 g of the reaction product was obtained which contained 1.022 moles tertiary nitrogen atoms (these nitrogen atoms are from the condensed piperazine and can be oxidized) was heated to 40° C. and oxidized at this temperature by the addition of 80.7 g (1.12 moles) of a 47.2% strength by weight aqueous solution of hydrogen peroxide within 5 hours. The reaction mixture was stirred at 50–60° C. until the theoretical amount of hydrogen peroxide necessary for the oxidation had been consumed. The excess of hydrogen peroxide was destroyed by Pt/C, the polymer solution filtered and cooled to room temperature. 296.8 g of an aqueous solution of an amphoteric amine based polymer having a net cationic charge of 0.7 were obtained. The aqueous solution had a pH of 2.86 and contained 58.6% of water. The amphoteric polymer had a molecular weight Mn=340, Mw=940 and Mw/Mn=2.8.

EXAMPLE 13

68.8 g (1.0 mole) of imidazole, 260.4 g (3.0 moles) of piperazine dissolved in 699.2 g of water were reacted according to the procedure given in Example 8 with 370 g (4 moles) of epichlorohydrin with the exception that the pH of the reaction medium was kept at 7 by the addition of a 50% strength by weight aqueous solution of sodium hydroxide. A sample of 500 g of the reaction product which contained 1.98 moles of tertiary nitrogen atoms (these nitrogen atoms are from the condensed piperazine and can be oxidized) was heated to 50° C. At this temperature 71.6 g (1.08 moles) of a 49% strength by weight aqueous solution of hydrogen peroxide were added within 3.5 hours. The mixture was then stirred for 12 hours at 50° C. After this period no more hydrogen peroxide could be detected. 537.4 g of an aqueous solution of an amphoteric amine based polymer having a net cationic charge of 1.2 mequiv/g polymer were obtained. The aqueous solution had a pH of 5.86 and contained 56.5% of water. The amphoteric polymer had a K value of 23.4, a molecular weight Mn=1,340, Mw=16,300 and Mw/Mn=12.2.

EXAMPLE 14

27.2 g (0.4 moles) of imidazole, 340.4 g (4.0 moles) of piperazine dissolved in 774.6 g of water were reacted according to the procedure given in Example 8 with 407 g (4.4 moles) of epichlorohydrin using 80 g (1.0 mole) of a 50% strength by weight aqueous solution of sodium hydroxide. A sample of 259.1 g of the reaction mixture which contained 1.272 moles of tertiary nitrogen atoms (these nitrogen atoms are from the condensed piperazine and can be oxidized) was heated to 60° C. At this temperature 113.6 g (1.6 moles) of a 50% strength by weight aqueous solution of hydrogen peroxide were added within 3.5 hours. The reaction mixture was then stirred for 2.5 hours at 60° C. and thereafter cooled to room temperature. A solution of an amphoteric amine based polymer having a net cationic charge of 0.3 mequiv/g and a K value was obtained. The aqueous solution had a pH of 5.49. The amphoteric polymer had a molecular weight Mn=430, Mw=1,420 and Mw/Mn=3.3. More than 95% of the tertiary nitrogen atoms had been oxidized.

We claim:

1. Amphoteric amine containing based polymers having a net cationic charge wherein the polymers are derived by reacting
   (a) at least one amine selected from the group consisting of linear alkylamines, branched alkylamines, cycloalkylamines, alkoxyamines, amino alcohols, cyclic amines containing at least one nitrogen atom in a ring structure, alkylenediamines, polyetherdiamines, polyalkylenepolyamines, mixtures of one of the said amines with at least one amino acid or a salt thereof, reaction products of the said amines with at least one anionic group containing alkylating agent wherein per mole of NH group of the amines of from 0.04 to 0.6 moles of the anionic group containing alkylating agent is reacted, and mixtures thereof,
with
   (b) at least one crosslinking agent selected from the group consisting of epihalohydrins, bishalohydrins of diols, bis-(halohydrins) of polyalkylene glycols, bis-(halohydrins) of polytetrahydrofurane, alkylene dihalides, alkylene trihalides, bisepoxides, triepoxides, tetraepoxides, and mixtures thereof,
in a molar ratio of (a):(b) of from 2:1 to 1:1.5 and
   (c) reacting the condensation products of (a) and (b) which are free of anionic groups with an anionic group containing alkylating agent or oxidizing their tertiary nitrogen atoms to N-oxides in such an amount that the resulting polymers have a net cationic charge.

2. Amphoteric amine containing polymers as claimed in claim 1, wherein
   (a) the amine is selected from the group consisting of (i) at least one cyclic amine containing at least two reactive nitrogen atoms and (ii) mixtures of at least one cyclic amine containing at least two reactive nitrogen atoms with at least one other amine containing 1 to 6 nitrogen atoms.

3. Amphoteric amine containing polymers as claimed in claim 1, wherein
   (a) the amine is selected from the group consisting of imidazole, 2-methylimidazole, 1-(2-aminoethylimidazole), 1-(3-aminopropylimidazole), benzimidazole, piperazine, 1-(2-aminoethyl) piperazine, 1,4-bis(2-aminoethyl)piperazine, 1-(3-aminopropyl)piperazine, 1,4-bis(3-aminopropyl) piperazine, mixtures thereof, and mixtures of (i) at least one of the said amines with (ii) N-alkylimidazoles with 1 to 25 carbon atoms in the alkyl group, 1-(2-hydroxyethyl)imidazole, 1-(2-hydroxypropyl) imidazole, quinoline, isoquinoline, cyclic secondary amines with 4 to 8 carbon atoms in the ring, and acyclic secondary amines with 2 to 25 carbon atoms,
   (b) the crosslinking agent is selected from the group consisting of 1,2-dichloroethane, 1,2-dichloropropane, 1,3-dichloropropane, 1,3-dichloropropane-2-ol, 1,4-dichlorobutane, 1,6-dichlorohexane, epichlorohydrin, bisepoxybutane, bisglycidyl ether of 4,4'-dihydroxydiphenyl-dimethylmethane, bishalohydrins of C2–C8-diols, bisglycidyl ethers of C2- to C18-diols, bisglycidyl ethers of polyalkylene glycols, and mixtures thereof and
   (c) the anionic group containing alkylating agent is chloroacetic acid, chloropropionic acid, chloroethanesulfonic acid, epoxysuccinic acid, propane sultone, 3-chloro-2-hydroxypropanesulfonic acid, and mixtures thereof and the oxidizing agent is hydrogen peroxide.

4. Amphoteric amine containing polymers as claimed in claim 1, wherein
   (a) the amino acid is selected from the group consisting of glycine, alanine, aspartic acid, lysine, arginine, threonine, 2-phenylglycine, 4-aminobutyric acid, 6-aminocaproic acid, 11-aminoundecanoic acid, iminodiacetic acid, sarcosine, 1-carboxymethylpiperazine, 1,4-bis(carboxymethyl)piperazine, 1-carboxymethylimidazole, anthranilic acid, sulfanilic acid, amidosulfonic acid, aminomethylsulfonic acid, aminoethylsulfonic acid, salts thereof, and mixtures thereof.

5. Amphoteric amine containing polymers as claimed in claim 1, wherein the polymers are obtained by reacting
   (b) the reaction products of (i) an amine selected from the group consisting of morpholine, piperidine, piperazine, 1-(2-hydroxyethyl)piperazine, 1-(2-aminoethyl) piperazine, imidazole, N-alkylimidazoles having 1–25 carbon atoms in the alkyl group, N-arylimidazoles, N-benzylimidazole and mixtures thereof, with (ii) an anionic group containing alkylating agent selected from the group consisting of 2-chloroacetic acid, 2-chloroethanesulfonic acid, vinylsulfonic acid, acrylic acid, methacrylic acid, maleic acid, chloropropionic acid, epoxysuccinic acid, propane sultone, 3-chloro-2-hydroxypropanesulfonic acid, salts thereof and mixtures thereof,
with
   (c) at least one crosslinking agent selected from the group consisting of 1,2-dichloroethane 1,2-dichloropropane, 1,3-dichloropropane, 1,3-dichloro-2-hydroxypropane, 1,4-dichlorobutane, 1,6-dichlorohexane, epichlorohydrin, bishalohydrins of C2- to C8-diols, bisglycidyl ethers of C2- to C18-diols, bisglycidyl ethers of polyalkylene glycols, and bisepoxybutane.

6. Amphoteric amine containing polymers as claimed in claim 1, wherein the polymers are obtained by reacting
   (a) piperazine, 1-(2-hydroxyethyl)piperazine, 1-(2-aminoethyl)piperazine, imidazole, N-alkylimidazoles having 1–25 carbon atoms in the alkyl group, N-arylimidazoles, N-benzylimidazole and mixtures thereof with (c) a crosslinking agent selected from the group consisting of 1,2-dichloroethane, 1,2-dichloropropane, 1,3-dichloropropane, 1,3-dichloropropane-2-ol, 1,4-dichlorobutane, 1,6-dichlorohexane, epichlorohydrin, bisepoxybutane, bisglycidyl ether of 4,4'-dihydroxydiphenyl-dimethylmethane, bishalohydrins of C2- to C8-diols, bisglycidyl ethers of C2- to C18-diols, bisglycidyl ethers of polyalkylene glycols, and mixtures thereof, and (c) introducing anionic groups-into the condensation products of (a) and (b) by reacting them with an anionic group containing alkylating agent selected from the group consisting of 2-chloroacetic acid, 2-chloroethanesulfonic acid, chloropropionic acid, epoxysuccinic acid, propane sultone and 3-chloro-2-hydroxypropane sulfonic acid.

7. Amphoteric amine containing polymers as claimed in claim 1, wherein the polymers are obtained by reacting (a) an amine selected from the group consisting of imidazole, 2-methylimidazole, 1-(2-aminoethylimidazole), 1-(3-aminopropylimidazole), benzimidazole, piperazine, 1-(2-aminoethyl)piperazine, 1,4-bis(2-aminoethyl)piperazine, 1-(3-aminopropyl)piperazine, 1,4-bis(3-aminopropyl)piperazine, mixtures thereof, and mixtures of (i) at least one of the said amines with (ii) N-alkylimidazoles with 1 to 25 carbon atoms in the alkyl group, 1-(2-hydroxyethyl)imidazole, 1-(2-hydroxypropyl)imidazole, quinoline, isoquinoline, cyclic secondary amines with 4 to 8 carbon atoms in the ring, and acyclic secondary amines with 2 to 25 carbon atoms with (b) a crosslinking agent selected from the group consisting of 1,2-dichloroethane, 1,2-dichloropropane, 1,3-dichloropropane, 1,3-dichloropropane-2-ol, 1,4-dichlorobutane, 1,6-dichlorohexane, epichlorohydrin, bisepoxybutane, bisglycidyl ether of 4,4'-dihydroxydiphenyl-dimethylmethane, bishalohydrins of C2- to C8-diols, bisglycidyl ethers of C2- to C18-diols, bisglycidyl ethers of polyalkylene glycols, and mixtures thereof, and (c) introducing anionic groups into the condensation products of (a) and (b) by oxidizing their tertiary nitrogen atoms to N-oxides in such an amount that the resulting polymers have a net cationic charge.

8. Amphoteric amine containing polymers as claimed in claim 1, wherein the polymers are obtained by reacting (a)

(i) an amine selected from the group consisting of imidazole, 2-methylimidazole, 1-(2-aminoethylimidazole), 1-(3-aminopropylimidazole), benzimidazole, piperazine, 1-(2-aminoethyl)piperazine, 1,4-bis(2-aminoethyl)piperazine, 1-(3-aminopropyl)piperazine, 1,4-bis(3-aminopropyl)piperazine, mixtures thereof, and mixtures of (i) at least one of the said amines with (i') N-alkylimidazoles with 1 to 25 carbon atoms in the alkyl group, 1-(2-hydroxyethyl)imidazole, 1-(2-hydroxypropyl)imidazole, quinoline, isoquinoline, cyclic secondary amines with 4 to 8 carbon atoms in the ring, and acyclic secondary amines with 2 to 25 carbon atoms, with (ii) an anionic group containing alkylating agent selected from the group consisting of 2-chloroacetic acid, 2-chloroethanesulfonic acid, vinylsulfonic acid, acrylic acid, methacrylic acid, maleic acid, chloropropionic acid, epoxysuccinic acid, propane sultone, 3-chloro-2-hydroxypropanesulfonic acid, salts thereof and mixtures thereof and subsequently with (b) a crosslinking agent selected from the group consisting of 1,2-dichloroethane, 1,2-dichloropropane, 1,3-dichloropropane, 1,3-dichloropropane-2-ol, 1,4-dichlorobutane, 1,6-dichlorohexane, epichlorohydrin, bisepoxybutane, bisglycidyl ether of 4,4'-dihydroxydiphenyl-dimethylmethane, bishalohydrins of $C_2$- to $C_8$-diols, bisglycidyl ethers of C2- to C18-diols, bisglycidyl ethers of polyalkylene glycols, and mixtures thereof, and (c) alkylating the condensation product of (a) and (b) with an alkylating agent free of acid groups selected from the group consisting of dimethyl sulfate, diethyl sulfate, ethylene oxide, propylene oxide, butylene oxide, styrene oxide, methyl chloride, ethylchloride and benzyl chloride in such an amount that the resulting polymers have a net cationic charge in both an acid and an alkaline medium.

9. Amphoteric amine containing polymers as claimed in claim 1, wherein the polymers are obtained by reacting (a) imidazole with an acid group containing alkylating agent consisting of 2-chloroacetic acid, 3-chloro-2-hydroxypropanesulfonic acid, and sodium salts thereof, in a molar ratio of from 1:0.04 to 1:0.6 and (b) condensing the reaction product obtained with epichlorohydrin using per mole of condensed imidazole in the reaction product 0.5 to 1.2 moles of epichlorohydrin.

10. Amphoteric amine containing polymers as claimed in claim 1, wherein the polymers are obtained by reacting (a) an amine selected from mixtures of imidazole with piperazine in a molar ratio of 1:0.1 to 1:10 with (b) epichlorohydrin in a molar ratio of (a) to (b) of from 1:0.5 to 1:1.2 and (c) reacting the condensation product of (a) and (b) with an acid group containing alkylating agent selected from the group consisting of chloroacetic acid, 3-chloro-2-hydroxypropanesulfonic acid, sodium salts thereof, and mixtures thereof, using per mole of condensed piperazine in the condensation product from 0.1 to 2 moles of the alkylating agent.

11. Process for the production of amphoteric amine containing polymers having a net cationic charge which comprises reacting (a) at least one amine selected from the group consisting of linear alkylamines, branched alkylamines, cycloalkylamines, alkoxyamines, amino alcohols, cyclic amines containing at least one nitrogen atom in a ring structure, alkylenediamines, polyetherdiamines, polyalkylenepolyamiaes, mixtures of one of the said amines with at least one amino acid or a salt thereof, reaction products of the said amines with at least one anionic group containing alkylating agent wherein per mole of NH group of the amines of from 0.04 to 0.6 moles of the anionic group containing alkylating agent is reacted, and mixtures thereof, with (b) at least one crosslinking agent selected from the group consisting of epihalohydrins, bishalohydrins of diols, bis-(halohydrins) of polyalkylene glycols, bis-(halohydrins) of polytetrahydrofurane, alkylene dihalides, alkylene trihalides, bisepoxides, triepoxides, tetraepoxides, and mixtures thereof, in a molar ratio of (a):(b) of from 2:1 to 1:1.5 and (c) reacting the condensation products of (a) and (b) which are free of anionic groups with an anionic group containing alkylating agent or oxidizing their tertiary nitrogen atoms to N-oxides in such an amount that the resulting polymers have a net cationic charge.

12. A process for the production of amphoteric amine containing polymers as claimed in claim 11, wherein (a) the amine is selected from the group consisting of (i) at least one cyclic amine containing at least two reactive nitrogen atoms and (ii) mixtures of at least one cyclic amine containing at least two reactive nitrogen atoms with at least one other amine containing 1 to 6 nitrogen atoms.

13. A process for the production of amphoteric amine containing polymers as claimed in claim 11, wherein (a) the amino acid is selected from the group consisting of glycine, alanine, aspartic acid, lysine, arginine, threonine, 2-phenylglycine, 4-aminobutyric acid, 6-aminocaproic acid, 11-aminoundecanoic acid, iminodiacetic acid, sarcosine, 1-carboxymethylpiperazine, 1,4-bis(carboxymethyl)piperazine, 1-carboxymethylimidazole, anthranilic acid, sulfanilic acid, amidosulfonic acid, aminomethylsulfonic acid, aminoethylsulfonic acid, salts thereof, and mixtures thereof.

14. A process for the production of amphoteric amine containing polymers as claimed in claim 11, wherein (a) the amine is selected from the group consisting of imidazole, 2-methylimidazole, 1-(2-aminoethylimidazole), 1-(3-aminopropylimidazole), benzimidazole, piperazine, 1-(2-aminoethyl)piperazine, 1,4-bis(2-aminoethyl)piperazine, 1-(3-aminopropyl)piperazine, 1,4-bis(3-aminopropyl)piperazine, mixtures thereof, and mixtures of (i) at least one of the said amines with (ii) N-alkylimidazoles with 1 to 25 carbon atoms in the alkyl group, 1-(2-hydroxyethyl)imidazole, 1-(2-hydroxypropyl)imidazole, quinoline, isoquinoline, cyclic secondary amines with 4 to 8 carbon atoms in the ring, and acyclic secondary amines with 2 to 25 carbon atoms, (b) the crosslinking agent is selected from the group consisting of 1,2-dichloroethane, 1,2-dichloropropane, 1,3-dichloropropane, 1,3-dichloropropane-2-ol, 1,4-dichlorobutane, 1,6-dichlorohexane, epichlorohydrin, bisepoxybutane, bisglycidyl ether of 4,4'-dihydroxydiphenyldimethylmethane, bishalohydrins of C2–C8-diols, bisglycidyl ethers of C2- to C18-diols, biaglycidyl ethers of polyalkylene glycols, and mixtures thereof and (c) the anionic group containing alkylating agent is chloroacetic acid, chloropropionic acid, chloroethanesulfonic acid, epoxysuccinic acid, propane sultone, 3-chloro-2-hydroxypropanesulfonic acid, and mixtures thereof and the oxidizing agent is hydrogen peroxide.

15. A process for the production of amphoteric amine containing polymers as claimed in claim 11, wherein (a) an amine selected from the group consisting of morpholine, piperidine, piperazine, 1-(2-hydroxyethyl)piperazine, 1-(2-aminoethyl)piperazine, imidazole, N-alkylimidazoles having 1–25 carbon atoms in the alkyl group, N-arylimidazoles, N-benzylimidazole and mixtures thereof, is first reacted with an anionic group containing alkylating agent selected from the group consisting of 2-chloroacetic acid, 2-chloroethanesulfonic acid, vinylsulfonic acid, acrylic acid, methacrylic acid, maleic acid, chloropropionic acid, epoxysuccinic acid, propane sultone, 3-chloro-2-hydroxypropanesulfonic acid, salts thereof and mixtures thereof, and then crosslinked with (b) at least one crosslinking agent selected from the group consisting of 1,2-dichloroethane, 1,2-dichloropropane, 1,3-dichloropropane, 1,3-dichloro-2-hydroxypropane, 1,4-dichlorobutane, 1,6-dichlorohexane, epichlorohydrin, bishalohydrins of C2- to C8-diols, bisglycidyl ethers of C2- to C18-diols, bisglycidyl ethers of polyalkylene glycols, and bisepoxybutane.

16. A process for the production of amphoteric amine containing polymers as claimed in claim 11, which comprises reacting (a) an amine selected from the group consisting of imidazole, 2-methylimidazole, 1-(2-aminoethylimidazole), 1-(3-aminopropylimidazole), benzimidazole, piperazine, 1-(2-aminoethyl)piperazine, 1,4-bis(2-aminoethyl)piperazine, 1-(3-aminopropyl)piperazine, 1,4-bis(3-aminopropyl)piperazine, mixtures thereof, and mixtures of (i) at least one of the said amines with (ii) N-alkylimidazoles with 1 to 25 carbon atoms in the alkyl group, 1-(2-hydroxyethyl)imidazole, 1-(2-hydroxypropyl)imidazole, quinoline, isoquinoline, cyclic secondary amines with 4 to 8 carbon atoms in the ring, and acyclic secondary amines with 2 to 25 carbon atoms with (b) a crosslinking agent selected from the group consisting of 1,2-dichloroethane, 1,2-dichloropropane, 1,3-dichloropropane, 1,3-dichloropropane-2-ol, 1,4-dichlorobutane, 1,6-dichlorohexane, epichlorohydrin, bisepoxybutane, bisglycidyl ether of 4,4'-dihydroxydiphenyl-dimethylmethane, bishalohydrins of C2- to C8-diols, bisglycidyl ethers of C2- to C18-diols, bisglycidyl ethers of polyalkylene glycols, and mixtures thereof, and (c) introducing anionic groups into the condensation products of (a) and (b) by oxidizing their tertiary nitrogen atoms to N-oxides in such an amount that the resulting polymers have a net cationic charge.

17. A process for the production of amphoteric amine containing polymers as claimed in claim 11, which comprises reacting (a) an amine selected from the group consisting of imidazole, 2-methylimidazole, 1-(2-aminoethylimidazole), 1-(3-aminopropylimidazole), benzimidazole, piperazine, 1-(2-aminoethyl)piperazine, 1,4-bis(2-aminoethyl)piperazine, 1-(3-aminopropyl)piperazine, 1,4-bis(3-aminopropyl)piperazine, mixtures thereof, and mixtures of (i) at least one of the said amines with (ii) N-alkylimidazoles with 1 to 25 carbon atoms in the alkyl group, 1-(2-hydroxyethyl)imidazole, 1-(2-hydroxypropyl)imidazole, quinoline, isoquinoline, cyclic secondary amines with 4 to 8 carbon atoms in the ring, and acyclic secondary amines with 2 to 25 carbon atoms, with (b) an anionic group containing alkylating agent selected from the group consisting of 2-chloroacetic acid, 2-chloroethanesulfonic acid, vinylsulfonic acid, acrylic acid, methacrylic acid, maleic acid, chloropropionic acid, epoxysuccinic acid, propane sultone, 3-chloro-2-hydroxypropanesulfonic acid, salts thereof and mixtures thereof and further reacting the products obtained with (c) a crosslinking agent selected from the group consisting of 1,2-dichloroethane, 1,2-dichloropropane, 1,3- dichloropropane, 1,3-dichloropropane-2-ol, 1,4-dichlorobutane, 1,6-dichlorohexane, epichlorohydrin, bisepoxybutane, bisglycidyl ether of 4,4'-dihydroxydiphenyl-dimethylmethane, bishalohydrins of C2- to C18-diols, bisglycidyl ethers of C2- to C18-diols, bisglycidyl ethers of polyalkylene glycols, and mixtures thereof, and (d) alkylating the condensation products abtained under (c) with an alkylating agent free of acid groups selected from the group consisting of dimethyl sulfate, diethyl sulfate, ethylene oxide, propylene oxide, butylene oxide, styrene oxide, methyl chloride, ethylchloride and benzyl chloride in such an amount that the resulting polymers have a net cationic charge in both an acid and an alkaline medium.

18. A process for the production of amphoteric amine containing polymers as claimed in claim 1, which comprises reating (a) imidazole with an acid group containing alkylating agent consisting of 2-chloroacetic acid, 3-chloro-2-hydroxypropanesulfonic acid, and sodium salts thereof, in a molar ratio of from 1:0.04 to 1:0.6 and (b) condensing the reaction product obtained with epichlorohydrin using per mole of imidazole contained in the reaction mixture of (a) 0.5 to 1.2 moles of epichlorohydrin.

19. A process for the production of amphoteric amine containing polymers as claimed in claim 1, which comprises reating (a) an amine selected from mixtures of imidazole with piperazine in a molar ratio of 1:0.1 to 1:10 with (b) epichlorohydrin in a molar ratio of (a) to (b) of from 1:0.5 to 1:1.2 and (c) reacting the condensation product of (a) and (b) with an acid group containing alkylating agent selected from the group consisting of chloroacetic acid, 3-chloro-2-hydroxypropanesulfonic acid, sodium salts thereof, and mixtures thereof, using per mole of piperazine in the reaction mixture from 0.1 to 2 moles of the alkylating agent.

* * * * *